United States Patent [19]
Quenot et al.

[11] 4,189,107
[45] Feb. 19, 1980

[54] COILABLE RULE WITH AUTOMATIC RECOIL

[75] Inventors: Michel Quenot, Besancon; Louis Scandella, Marnay; Jean-Claude Grillier, Besançon, all of France

[73] Assignee: Stanley-Mabo S.A., France

[21] Appl. No.: 915,802

[22] Filed: Jun. 15, 1978

[30] Foreign Application Priority Data

Jun. 6, 1977 [FR] France .................. 77 19053
Apr. 12, 1978 [FR] France .................. 78 11434

[51] Int. Cl.² .................. B65H 75/16; G01B 3/02
[52] U.S. Cl. .................. 242/84.8; 33/138
[58] Field of Search .............. 242/84.8, 107, 107.3; 33/138, 126.6

[56] References Cited

U.S. PATENT DOCUMENTS

| | | | |
|---|---|---|---|
| 2,268,178 | 12/1941 | Boisture | 242/84.8 |
| 3,164,526 | 1/1965 | Girard | 242/107.3 X |
| 3,311,319 | 3/1967 | Campbell | 242/84.8 X |
| 3,347,487 | 10/1967 | Seller | 242/84.8 |
| 3,473,751 | 10/1969 | Quenot | 242/84.8 X |
| 3,838,518 | 10/1974 | Hendrickson | 33/126.6 |

Primary Examiner—Edward J. McCarthy
Attorney, Agent, or Firm—Prutzman, Kalb, Chilton & Alix

[57] ABSTRACT

A measuring tape is contained in a housing which includes an electric motor for rotating the spool on which the tape is wound to wind the tape up. A safety mechanism is provided to switch the motor off when the tape is fully wound, and a reduction mechanism is provided between the motor and the spool, so that the spool can rotate more slowly than the motor. The instrument is portable and has a handle with which an operating switch may be associated. The motor may be battery driven.

15 Claims, 17 Drawing Figures

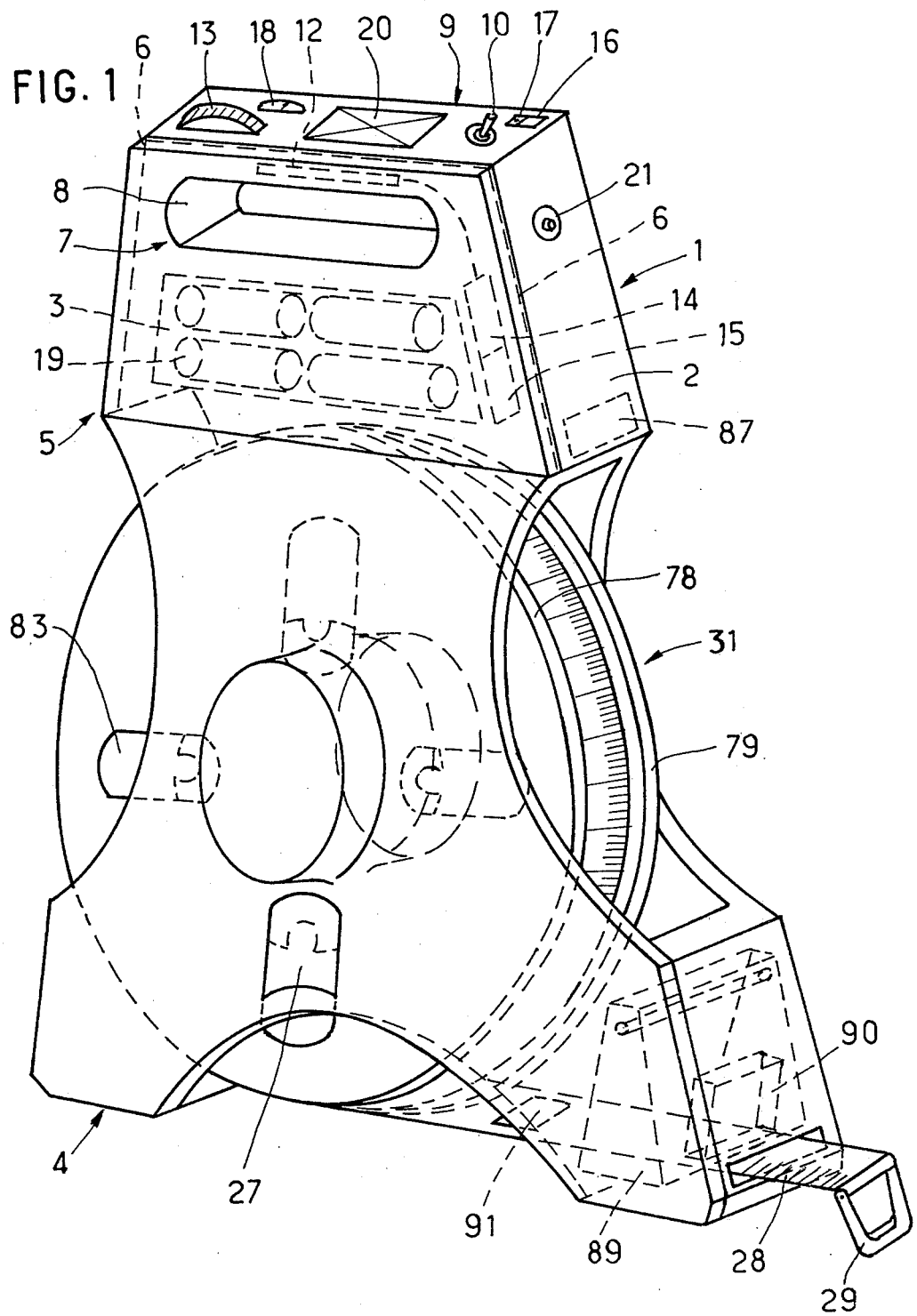

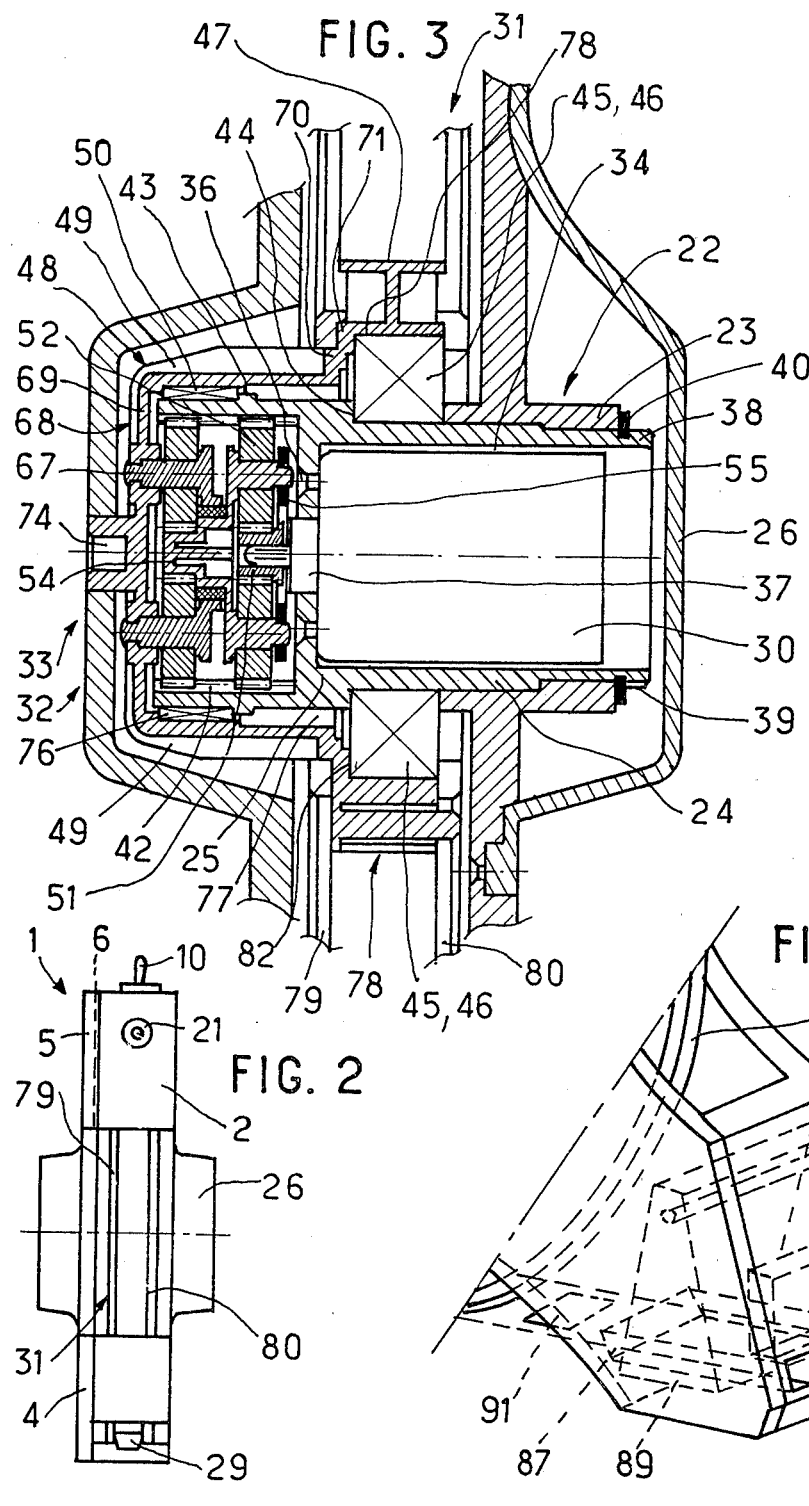

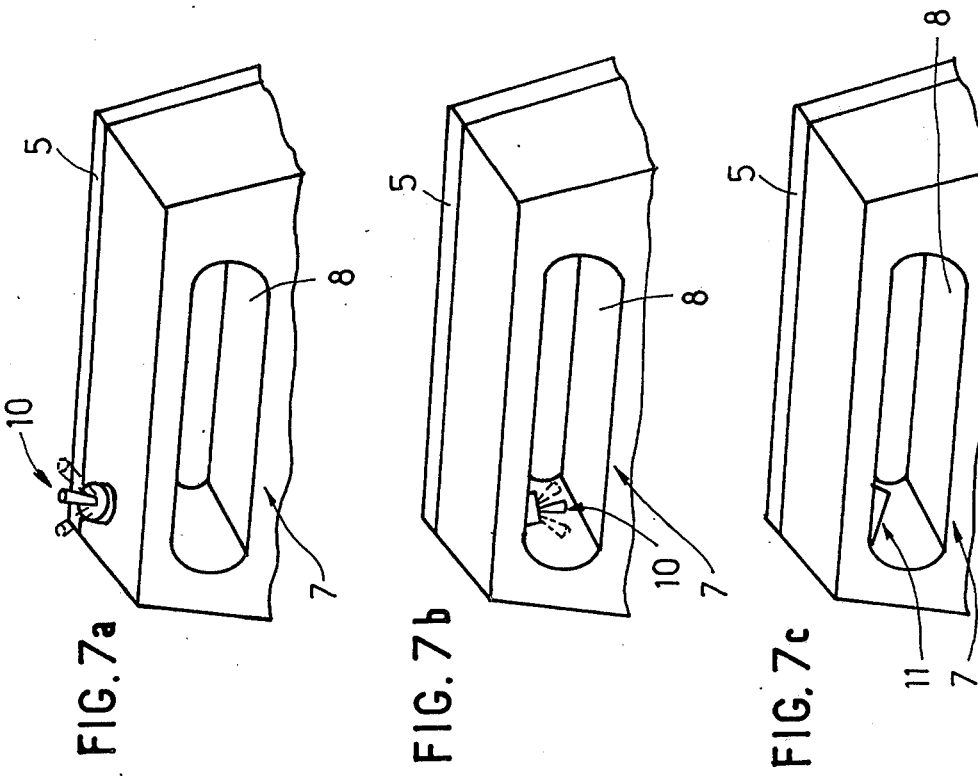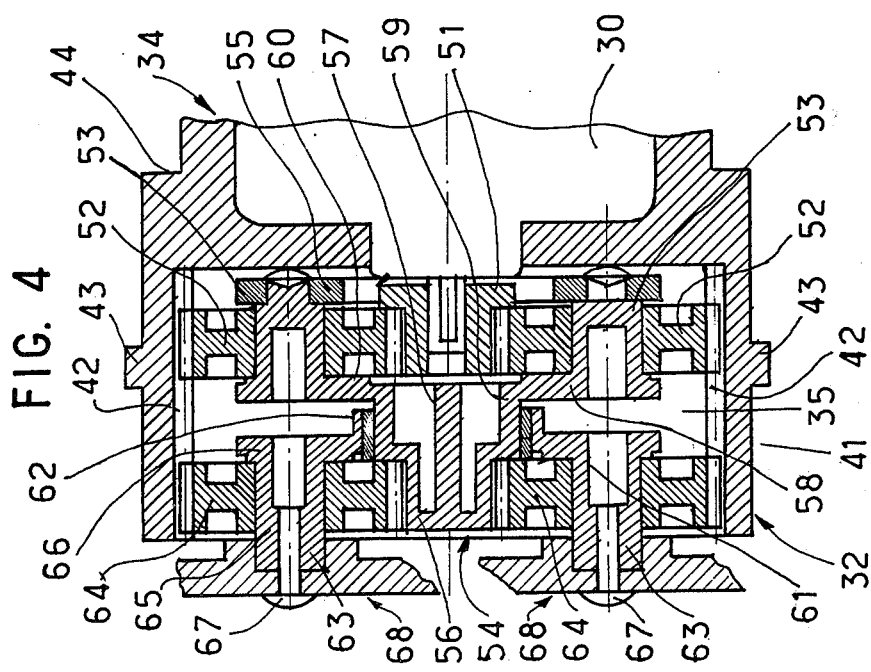

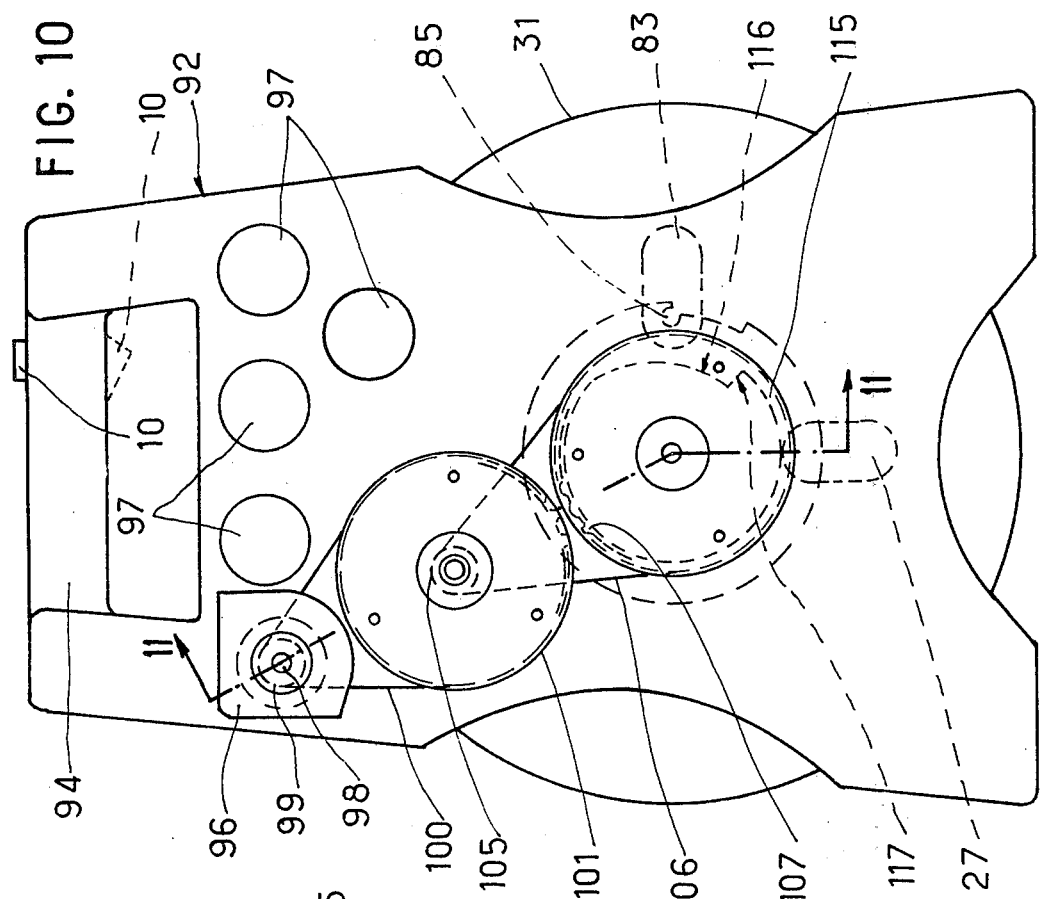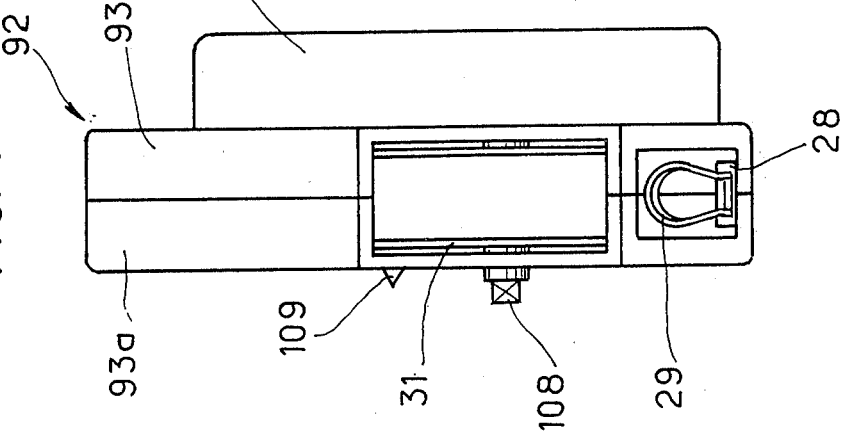

COILABLE RULE WITH AUTOMATIC RECOIL

FIELD OF THE INVENTION

This invention relates to a length measuring instrument including a measuring tape and an electric motor for winding the tape onto a spool.

BACKGROUND OF THE INVENTION

Technological development has enabled tape measures of much easier use to be offered to users.

This is attained by automatic winding of the tape by an electric motor. This rapid uniform winding is of appreciable aid in all applications, and more particularly in the case of long-length tapes used by professionals concerned with measurement, such as land surveyors, quantity surveyors, inspectors and geometricians.

Such measuring instruments are already known in which the electric motor drives the spool or spindle through a high ratio mechanical reducer.

The reducer conceived in this manner has to have a high reduction ratio in order to enable small motors to be used which by their structure rotate at high speeds. In addition, for commercial reasons these reducers are required to be simple, light and cheap.

Fundamental difficulties arise, and for a long time it has been believed that the characteristics required of the high ratio reducer make its application difficult and complicated, and for this reason there has been hesitation in providing linear measuring instruments with such devices.

A further difficulty is inherent to the winding itself. At a constant angular driving speed, the linear speed of the tape varies with the beginning and end of winding, so that even in the case of average spools there are large variations in speed, for example of the order of double.

The linear speeds at the end of winding can thus attain values which require shock absorbing at the end of the tape in order to prevent damage thereto and possibly to the end ring.

OBJECTS OF THE INVENTION

The invention seeks to solve the problems of the prior art, and to provide an improved strong and small automatically winding instrument which is of simple construction, inexpensive, easy to use and reliable.

SUMMARY OF THE INVENTION

A length measuring instrument comprising:
a housing;
a spool mounted for rotation in the housing;
a measuring tape wound on the spool;
an electric motor for rotating the spool to wind the tape thereon;
a reduction mechanism between the motor and the spool;
means for supplying electricity to the motor;
a device on the spool for attaching the end of the tape thereto; and
a safety device for switching off the motor when the tape has been completely wound up,
the means for supplying electricity, the reduction mechanism and the motor all being contained in sealed compartments.

Other features and advantages of the invention will become apparent from the following description which is to be read in conjunction with the accompanying drawings.

BRIEF DESCRIPTION OF THE DRAWINGS

FIG. 1 is a perspective view of the linear measuring instrument fitted with a coaxial reducer drive mechanism;

FIG. 2 is a front view of the instrument of FIG. 1;

FIG. 3 is a cross-section through the drive mechanism fitted with a spool for the tape measure provided inside a casing;

FIG. 4 is a detailed view of part of FIG. 3 showing in particular the internal structure of the coaxial reducer of this embodiment;

FIG. 7a is a diagrammatic view of a grip for a linear measuring instrument, fitted with a switch (reverse direction of observation);

FIG. 7b is a diagrammatic view of another grip for a linear measuring instrument, fitted with an internal switch (reverse direction of observation);

FIG. 7c is a diagrammatic view of a third grip for a linear measuring instrument fitted with a trigger switch;

FIG. 8 is a diagrammatic perspective view of one embodiment of the end of the instrument at the tape outlet;

FIG. 9 is a front view of the instrument according to the invention comprising a belt reducer;

FIG. 10 is an elevation of the instrument of FIG. 9 with the cover removed;

DETAILED DESCRIPTION OF THE PREFERRED EMBODIMENTS

Figure 6:
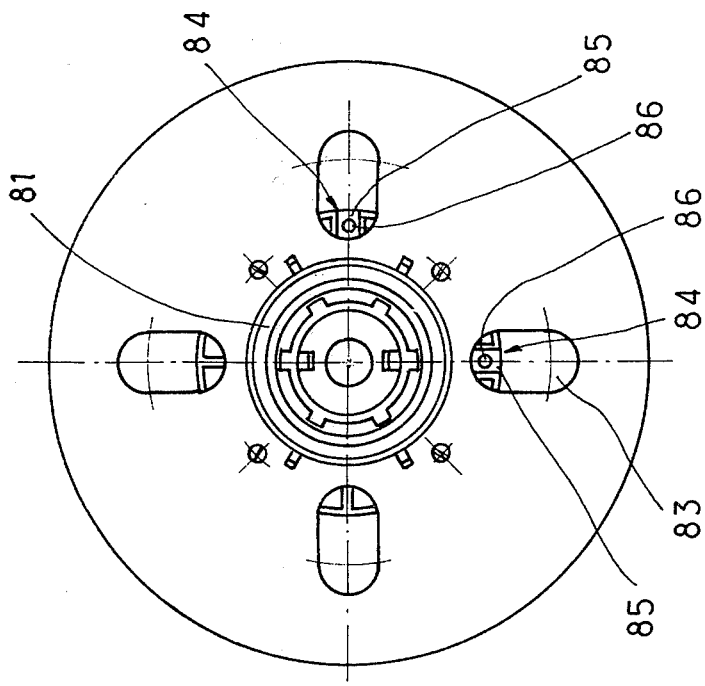
FIG. 6 is a plan view of the device on the motor side.

The main embodiment of the invention comprising a reducer in the form of sun and planet gears will firstly be described.

In this case, the instrument body comprises, in one embodiment, a frame or casing 1 generally of inverted Y shape formed for example from a solid piece 2 comprising at the top a sealed cavity 3 for housing batteries and control members, and a cover plate 4 comprising, in a preferred embodiment of the invention, an upper removable part 5 provided with sealing means 6 for protecting the cavity 3, for example in the form of a beading or slider protected by a flexible section.

The upper part of the frame is shaped as a grip 7 which is totally integrated with the general shape of the assembly, and is in the form of an aperture 8 generally of rectangular section.

The top edge 9 of the piece 2 carries the controls and viewing ports.

An operating control is provided in the form of a switch 10, for example a three-position lever switch comprising stop, reduced speed and normal operation (FIGS. 7a and 7b).

The operating control can alternatively be in the form of a trigger switch 11 incorporated in the grip (FIG. 7c). The control is situated on the same side of the casing as the tape outlet.

In both these cases, the controls act on a speed adjuster 12 provided inside the casing or frame 1, and comprising a regulator 13.

The regulator can be of an electronic type (infinitely variable range), or of the type offering variation in steps by series-connection of the supply batteries.

Said speed adjuster is associated with a stop device 14 or deceleration device for the end of the tape, which will be described hereinafter.

The stop device can advantageously comprise a safety device 15, for example of electronic type, which disconnects the motor batteries when the motor torque passes a value judged to be dangerous.

A revolution counter 16, for example of the pulse type, can be provided as an option, to give automatic indication of the unwound length, for example as far as a reference mark provided at the outlet end.

The counter 16 advantageously comprises a device 17 for re-setting to zero. The top edge also includes visualisation and control means, which comprise an indicator 18 for indicating consumption of the ordinary or alkaline batteries 19 housed in the sealed cavity 3, and a pilot lamp 20 for indicating running and proper operation.

There is also provided on one of the oblique edges of the casing 1 an inlet socket 21, for example of the multi-position jack type, allowing the batteries to be connected in and out of the operating circuit to enable them to be recharged from an external direct current source.

A so-called floating branch-circuit can be provided on assembly to allow simultaneous use and recharge.

As indicated, the batteries are housed in the cavity 3 and are connected to controls and to an electric motor by internal wiring, of which some leads are embedded in the solid piece 2, so providing a considerable increase in useful volume and better reliability.

The main piece of the casing forming the housing of the instrument carries a central case or hub 24 of a coaxial drive device 25, in a central cylindrical seat 22 which is provided with splines 23, to hold the drive device rigidly.

The seat 22 is covered with a generally frusto conical protection cap 26.

The drive device 25 is protected on its opposite face by the lower part of the cover plate 4, which also is of frusto-conical shape in front of said device.

Between the cap 26 and the lower curvilinear limit of the cover plate, an access aperture 27 is provided at the level of apertures provided in the spool flange, for a blocking device to be described hereinafter and which enables the tape 28 to be fixed by one end provided with a connector 29.

The coaxial drive device 25 comprises an electric motor 30 housed and fixed in the central composite hub 24 for a spool 31 on which the measuring tape is to be wound. A reversible two-stage reducer 32 of the sun and planet gear type, and a mechanical drive assembly 33 complete the drive device.

The central case or hub 24 comprises two coaxial cylindrical chambers, namely a first chamber 34 for housing the motor 30 and an opposing reduction chamber 35 containing the reducer 32.

The motor is mounted and fixed in the chamber 34 by two screws such as 36, and has one central circular projection 37 carrying a bearing.

The chamber 34 comprises at its outer end splines 38 to prevent it rotating, these being engaged in the splines 23 of the central seat 22, and a transverse peripheral groove 39 into which a circlip 40 or a retention ring is inserted to prevent the chamber 34 moving laterally on the main piece of the instrument casing. The reduction chamber 35 (FIG. 4) is in the form of a cylindrical cage for the reducer. It comprises an inner wall 41 provided with teeth 42, and an outer wall which possesses an annular projection 43 in a central position.

The central case or hub 24 comprises at approximately midlength a shoulder 44 on which rests the cage 45 of a sealed ball bearing 46 mounted on said case and held between the shoulder 44 and the end edge of the cylindrical seat 22.

The bearing 46 carries the hub 47 of the spool 31 which is rigid with the mechanical drive assembly 33, so providing mechanical connection between the reducer exit and the hub.

The drive assembly 33 is in the form of a drive cage 48 entirely covering the reducer and its chamber. It possesses longitudinal strengthening ribs 49.

In order to improve the rotation, in terms of slack, stability, balance and vibration, the drive cage rests on the end of the reduction chamber by way of a guide element 50, for example a needle bearing, the cage of which is immobilised by the projection 43 at one end and the vertical wall of the drive cage.

A description is given hereinafter in detail of the reducer as designed for transmitting the drive motion.

The motor is connected to the reducer by way of a sun gear or drive pinion 51 mounted on the motor shaft and constituting its inlet pinion.

This pinion, together with three planetary pinions such as 52, form a first gear train providing the first reduction.

The planetary or satellite pinions are rotatably mounted on axles 53 of a planet carrier 54 and are prevented from making lateral movements by stop washers 55. They mesh with the teeth 42 of the inner lateral wall 41 which serves as a stationary ring gear.

The planet carrier 54, constructed of light aluminium alloy, has a generally U-shaped section comprising a base 56 in the form of a pinion which acts as a sun gear and engages with the planetary gears 64 of the exit stage.

The planet carrier 54 has a central branch 57 to give the necessary flexibility to the assembly, and has two side branches such as 58, each comprising at approximately their mid-length an offset part 59 followed by a transverse branch each in the form of a plate 60 which at its centre comprises the support axle 53 for a planetary pinion of the first stage.

The outer longitudinal part of the offset portion form a shoulder on which there is mounted a guide element, for example a plastics bush 61 serving as a bearing for the two reduction stages, on which are carried shoes 62 of exit axles 63 carrying the planetary pinions 64 of the second stage.

Said exit axles 63 are of right inverted T section, with a central rod 65 forming the axle itself and a circular base 66 for its lateral immobilisation. They have a reduced end piece to which the front surface 68 of a cover piece 69 constituting the front circular face of the drive cage 48 is riveted by rivets 67.

Here again, the planetary pinions are three in number and are disposed equidistantly on a circle, i.e. at 120° apart. They again mesh with the inner teeth of the lateral wall of the reduction cage.

The cover piece or drive cage 69 possesses a circular front part. This latter has two peripheral shoulders 70 and 71 for mounting a flange, and at least six radial ribs such as 72 (FIG. 5) in extension of the longitudinal ribs, and converging towards a central projection 73 comprising a hollow square head 74 for receiving the male part of a handle for its manual drive.

Three of the said ribs have circular reinforcements 75 at the ends of the exit axles 63.

The front face of the drive cage 48 defines, in cooperation with the outer lateral surface of the reduction chamber, two seats 76 and 77 separated by the projection 43.

As indicated, the end seat 76 contains the guide element 50, for example a needle race designed to improve stability and balance the movements of rotation of the drive cage about the motor block forming the hub.

The lateral cover wall of the drive cage extends in the form of shoulds 70 and 71 and a transverse structure 78 constituting the hub, and resting on the end shoulder, on the edges of which are fixed two circular flanges 79 and 80 which enable the wound tape turns to be contained laterally, this assembly constituting the spool 31.

A plastics material of low coefficient of friction is used for constructing these flanges in order to allow uniform winding at all speeds.

Figure 5:
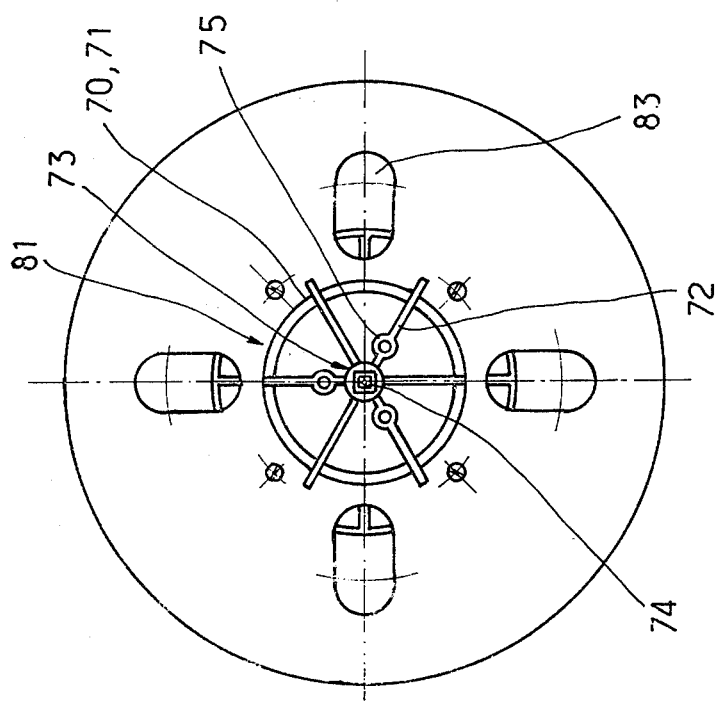
FIG. 5 is a plan view of the device on the reducer side.

The surface of each flange comprises a central circular aperture such as 81, for the passage of the motor or reduction block, and support surfaces 82 on the mandrel edges. In addition, the flange surface possesses four apertures or ports such as 83, which are orthoganally relative to the spool axis and are of oblong shape as shown in FIGS. 5 and 6, and through which a finger may be passed to hook the end of the measuring tape into a double column blocking device 84 provided on the hub.

This blocking device is in the form of two local transverse cavities such as 85, open at one of their ends and provided in the hub at the same level as two successive ports and comprising in a central position a longitudinal retention pin 86. One of the flanges possesses notches for the passage of the ends of the ribs.

FIG. 8 shows the tape outlet end. Here there is provided a guide 87, for example of generally cylindrical shape with a rectangular aperture, to pre-position the tape for its winding.

A device for detecting the end of the tape and a shock absorber are also provided. The shock absorber comprises a block 89 of flexible material with an aperture for the passage of the tape, and mounted for example so that it can swivel in order to prevent any damage to the connector 29 at the end of the tape when absorbing the shock.

The detection device consists of a block 90 sensitive to the passage of a reference mark 91 on the tape. This reference mark, which can be optical, magnetic (magnetic pad) or mechanical (over-thickness of a rivet for example), causes opening of a circuit or the generation of a detection signal in the detection block 90 which acts on the motor control to cause it to slow down or halt. It can be envisaged for example that a reduction in speed may be produced by reducing the supply voltage, by removing from the circuit one or more batteries, or that the motor may be stopped by disconnecting the power supply.

As stated, the described drive device can also be used to transmit the motion of the drive shaft of a drill or automatic screwdriver, by obvious simple adaptation.

A description is given hereinafter with reference to FIGS. 9 to 13, of a modified embodiment of a linear measuring instrument according to the invention, comprising a two stage reducer of belt type. Certain reference numerals are common in this and the previously described embodiment, insofar as they relate to the same components. This embodiment again comprises a generally Y-shaped frame or casing 92, made in two parts 93 and 93a, provided with a grip 94, and in which is mounted the winding spool 31 for the measuring tape 28 which terminates in a connector 29.

A seat is provided in the outer face of the part 93 of the frame for housing the drive device, this seat being covered by a sealed protection cap 95 fixed to the frame, for example by screws.

The spool 31 is driven by a motor 96 supplied by four batteries 97 connected in series. On the output shaft 98 of the motor there is fixed a pinion gear 99. The pinion gear 99 (FIG. 10) is connected via a toothed belt 100 to a first large gear wheel 101 freely turning on two ball bearings 102, 103 between the frame 92 and a positioning pivot 104 formed on the inner face of the cap 95. A second pinion gear 105 rigid with the pinion 101 is connected by a second toothed belt 106 to a second large gear wheel 107 fixed to one end of the axle of the spool 31. At its other end, this axle carries a square projection 108 on which a removable handle can be mounted for emergencies. A switch for the electric motor, for example a two speed switch, is provided on the upper face of the frame in the vicinity of the grip 94. This switch 10 is preferably a lever switch to give stopping, reduced speed and normal speed as heretofore described, for example by putting either some or all of the batteries into service.

Reduced speed prevents the sudden shock on the ring at the end of the tape. To absorb this shock, a shock absorbing pad or a swivel assembly is provided as previously described.

In addition, reduced speed can be set automatically as already described, by applying a reference mark to the tape in the vicinity of its end, for example an extra thickness (rivet) which contacts the finger of a limit switch.

A locking lever 109 mounted in a seat 110 in the face 93a enables the spool 31 to be locked when required. The lever 109 is fixed in the casing 92 by rivets 111, and is connected to a plate 112 which has two oblong apertures 113 through which rivets 111 extend. One end of the lever is provided with a projection 114 engaging in an annular groove 115 in the spool 31 which forms a ramp 116 terminating in a radial face 117.

Figure 11:
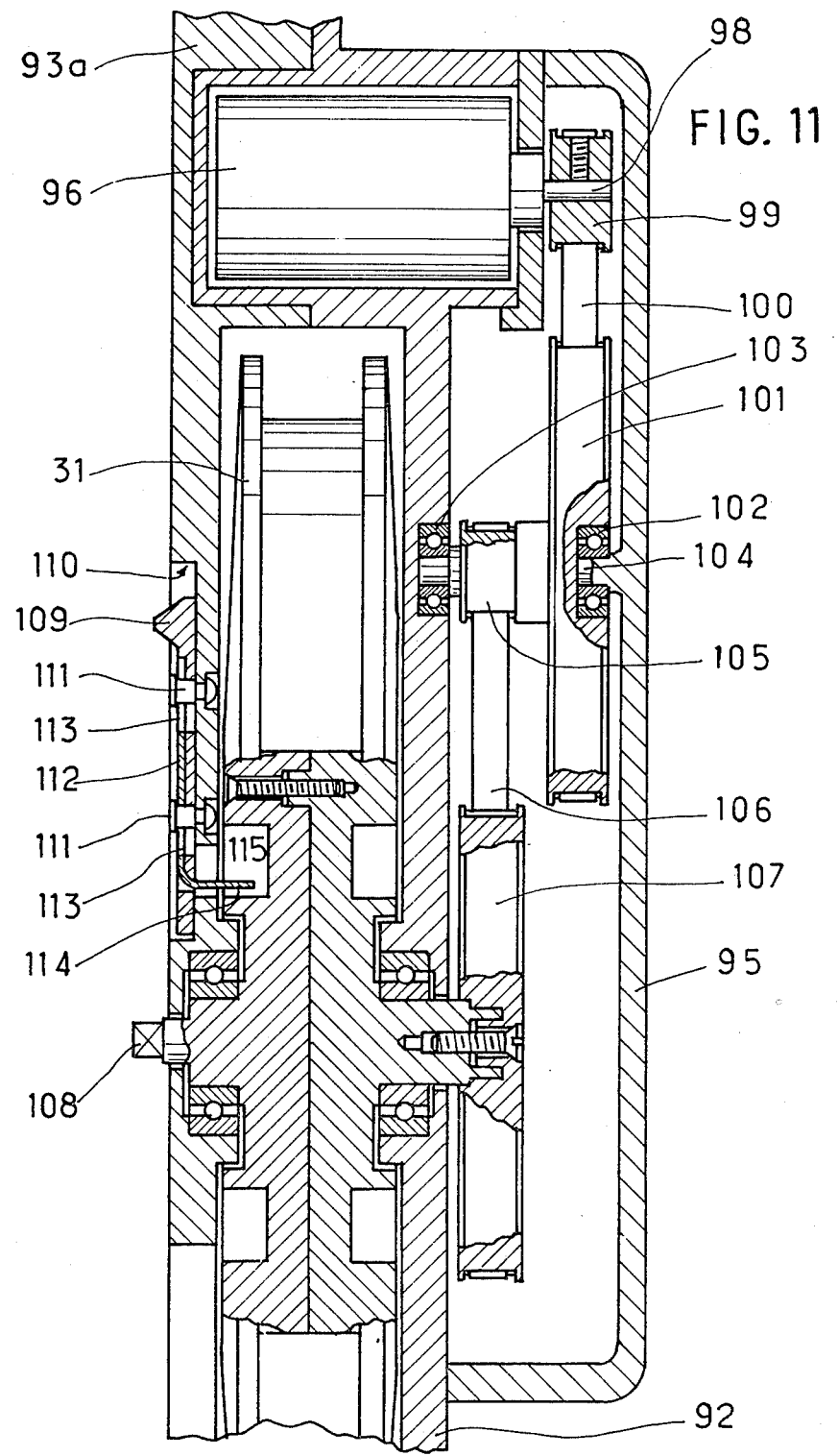
FIG. 11 is a section on the line XI–XI of FIG. 10.

When the required amount of tape has been pulled from the casing, the lever 109 is placed into the locking position as illustrated in FIG. 11. The projection 114 then abuts against the blunt face 117 of the groove 115, and thus the tape can no longer be pulled outwards. The ramp 116 is inclined so that, when the drum is driven in the winding-up direction, the locking lever 109 is automatically moved into the release position by the ramp 116.

A blocking device analogous to that previously described is provided, and comprises cavities 85, ports 83 and retention pins 86.

The casing also has an access aperture 27.

An external power supply or battery recharging socket is also provided.

In addition, because of the reversibility of the mechanism, it is possible to recharge the batteries during the unwinding of the tape, and for this purpose an electrical valve is provided in the circuit between the batteries and the motor, which then operates as a dynamo.

It has been found that when using a micro-motor having an approximate speed of 11000 r.p.m., and supplied by four batteries each of 1.2 Volts connected in series, plus a speed reducer with a ratio of 1:25 and comprising two 1:5 transmissions, a measuring tape 50 meters long can be completely wound within 20 seconds, whereas when using a normal handle, 1 to 2 minutes are required to wind the tape completely. This electrical drive device therefore enables time to be saved.

Figure 12:
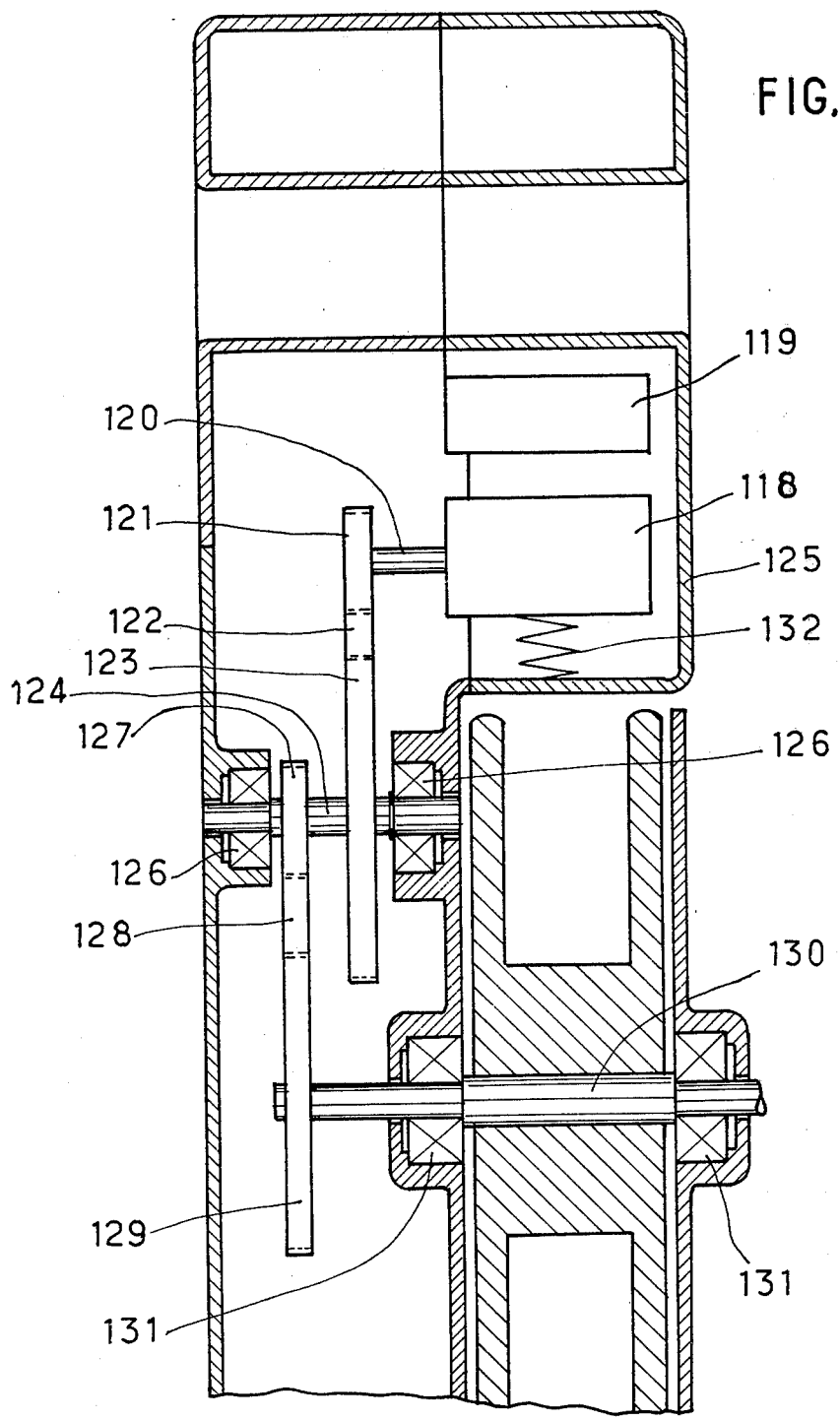
FIG. 12 is a partial section through another embodiment of the instrument.
Figure 13:
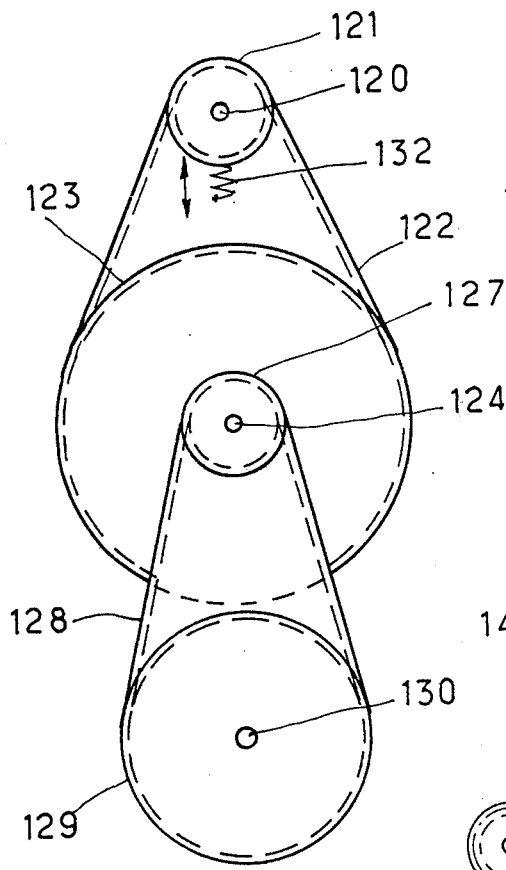
FIG. 13 is a diagrammatic elevation of the reducer of the embodiment shown in FIG. 12.

In the embodiment shown in FIGS. 12 and 13, a torque limiting device is provided to enable the motor to be uncoupled from the reducer, in particular if the reduction ratio is too high to allow the device to be reversible.

As in the case of the previous embodiment, the spool 31 is driven by a motor 118 (FIG. 12) supplied by batteries 119. A pinion gear 121, which constitutes the inlet pinion of a two stage reducer is fixed on the motor output shaft 120. The pinion gear 121 is connected by a toothed belt 122 to a first large wheel 123 which, according to a preferred embodiment of the invention, is smooth, and of which the axle 124 is supported in the frame 125 between two ball bearings 126. A second pinion gear 127 fixed on the axle 124 is connected by a second toothed belt 128 to a second large wheel 129 fixed on the axle 130 of the spool 31, which is mounted between two ball bearings such as 131.

The assembly formed by the motor 118, its exit shaft 120 and the pinion gear 121 is acted on by a spring 132 which normally keeps tension in the toothed belt 122 running between the pinion gear 121 and the first large smooth wheel 123. A trigger or button accessible from the outside of the instrument and not shown in the figures allows the assembly comprising the motor 118, shaft 120 and pinion gear 121 to be displaced by compressing spring 132, the effect of which is to slacken the toothed belt 122 and enable it to slide on the large smooth wheel 123 so that the spool 31 is no longer driven even if the motor 118 turns. The spool is now free and the tape can now either be manually pulled or wound by means of a handle mounted for example on the axle 130 of the spool, external to the protection flange 133. Additionally, when the torque in the system rises above a predetermined limit, the belt 122 will slip on the smooth wheel 123 to prevent the motor being overloaded.

The motor 118 is normally intended to wind up the tape on its drum, but an inverter can be provided to enable the motor to unwind the tape.

Figure 14:
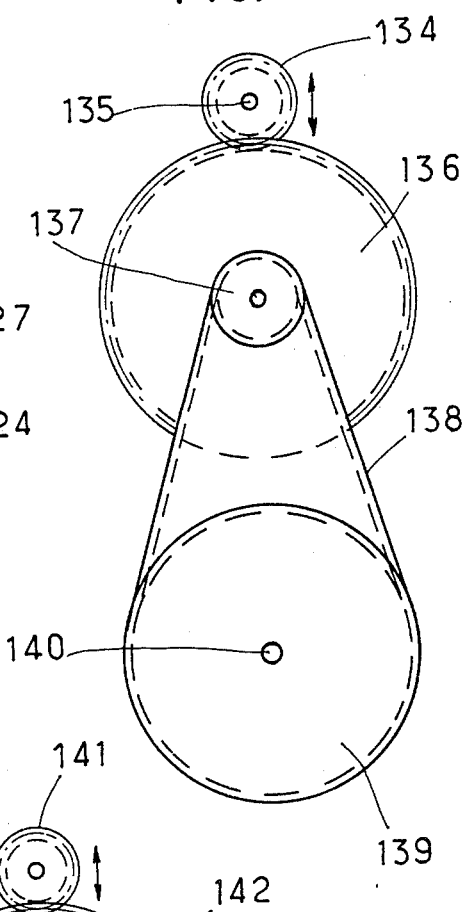
FIGS. 14 and 15 are diagrammatic elevation of two further embodiments of the reducer.

FIG. 14 shows a further embodiment of the reducer device. In this case, the input pinion 134 of the reducer mounted on the output shaft 135 of the motor engages directly with a first gear wheel 136, which as with the previous embodiment is rigid with a second pinion gear 137, which is connected by a toothed belt 138 to a second large wheel 139 fixed on the axle 140 of the winding spool. In this case there is also provided a decoupling device to enable the teeth of the input pinion 134 to be disengaged from the first large wheel 136 when required. As in the previous embodiment, this device comprises for example a spring (not shown) which normally pushes the pinion 134 into engagement with the first large wheel 136, and a trigger system enabling the assembly consisting of the motor, drive shaft and input pinion to be displaced against the action of said spring so as to disengage the teeth from the wheels.

Figure 15:
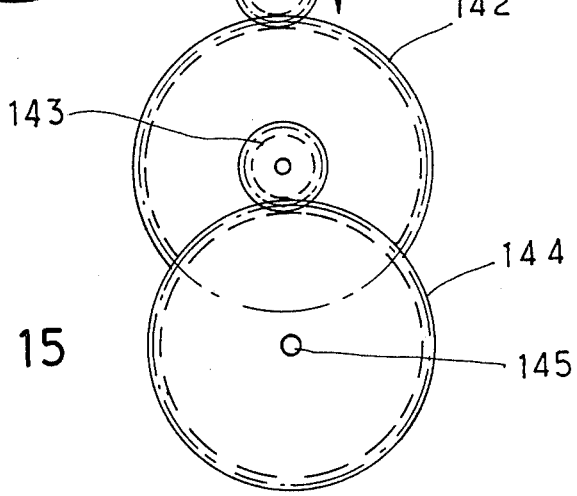

FIG. 15 shows a further embodiment comprising two gear trains with gear wheels, with direct engagement between an input pinion 141 and a first large gear wheel 142 as well as between a second pinion gear 143 and a second large gear wheel 144 fixed on the shaft 145 of the winding spool. This embodiment advantageously enables space to be saved inside the frame. In this case, the assembly formed by the input pinion 141 and the motor is again acted on by a spring which pushes said pinion into engagement with the first large wheel, and there is provided a trigger device to enable said pinion to be disengaged from said wheel when required.

We claim:

1. A length measuring instrument comprising:
   a housing;
   a spool mounted for rotation in the housing;
   a measuring tape mounted on the spool;
   an electrical motor for rotating the spool to wind the tape thereon; and
   a reduction mechanism between the motor and the spool;
   said instrument characterised in that the housing provides a nonrotatable hollow hub and the motor and reduction mechanism are disposed within the hollow hub coaxially with the spool.

2. An instrument as claimed in claim 1 characterised in that the spool is mounted by the hub for relative rotation therewith.

3. An instrument as claimed in claim 1 including a control circuit for said motor, said control circuit including a detector for generating a signal when the tape is substantially fully recoiled on the spool for modifying the delivery of electricity to the motor.

4. An instrument as claimed in claim 1 wherein said housing provides sealed compartments for the reduction mechanism and the motor.

5. An instrument as claimed in claim 1 wherein said reduction mechanism is a two-stage planetary gear train.

6. An instrument as claimed in claim 5, characterised in that the exit stage of the reduction mechanism is mechanically connected to the spool by a drive cage.

7. An instrument as claimed in claim 3, characterised in that the detector consists of a reference mark placed on the tape in the vicinity of its free end and a detection block sensitive to the passage of said reference mark to provide a signal to modify the electricity supply to the motor.

8. An instrument as claimed in claim 1, characterised in that a block of flexible material is mounted in a position corresponding with the outlet end of the tape to act as a shock-absorber.

9. An instrument as claimed in claim 1, characterised in that a double function electrical control switch is provided to enable the motor to be driven at a lower speed when only a few dozen centimeters of tape remain to be wound.

10. An instrument as claimed in claim 1, wherein electricity is supplied to the motor from a battery, and the motor and its circuit are designed in such a manner that the battery is recharged as the tape unwinds.

11. A length measuring instrument comprising:
    a housing;
    a spool mounted for rotation in the housing;
    a measuring tape wound on the spool;
    an electric motor for rotating the spool to wind the tape thereon;

a two-stage epicyclic gear reduction mechanism between the motor and the spool with each of the stages thereof comprising a sun wheel, a ring gear and satellite pinion gears mounted by a drive cage and engaging the sun wheel and the ring gear;

the sun wheel of a first gear stage being mounted on the motor output shaft and the ring gear being formed on a wall of the housing, force being transferred to the second gear stage via the drive cage of the first stage;

means for supplying electricity to the motor;

a device on the spool for attaching the end of the tape thereto; and a safety device for switching off the motor when the tape has been completely wound up, the means for supplying electricity, the reduction mechanism and the motor all being contained in sealed compartments.

12. An instrument as claimed in claim 11, characterised in that the drive cage of the first stage is constructed of aluminium alloy and has a base formed as a pinion to act as a sun wheel for the second gear stage, the ring gear being common to both stages.

13. An instrument as claimed in claim 11, characterised in that a shoulder is provided on the drive cage of the first stage, and a guide element is mounted on the shoulder to form a bearing for the drive cage of the second stage which provides the output from the epicyclic gear.

14. An instrument as claimed in claim 11, wherein a handle is formed in an upper part of the housing, and controls are provided adjacent the handle.

15. An instrument as claimed in claim 14, characterised in that an operating control is integral with the handle, under its lower face, and is a trigger control.

* * * * *